United States Patent
Clark et al.

(10) Patent No.: US 9,559,996 B1
(45) Date of Patent: Jan. 31, 2017

(54) SYSTEMS AND METHODS FOR INTEGRATING CLOUD STORAGE AND NETWORK SERVICE

(71) Applicant: Google Inc., Mountain View, CA (US)

(72) Inventors: Stephen Nowland Clark, Boulder, CO (US); Joshua Hudgins, Lafayette, CO (US); Mandy Richau Sladden, Lafayette, CO (US)

(73) Assignee: Google Inc., Mountain View, CA (US)

( * ) Notice: Subject to any disclaimer, the term of this patent is extended or adjusted under 35 U.S.C. 154(b) by 395 days.

(21) Appl. No.: 13/933,972

(22) Filed: Jul. 2, 2013

(51) Int. Cl.
*G06F 13/00* (2006.01)
*H04L 12/58* (2006.01)

(52) U.S. Cl.
CPC .................................... *H04L 51/08* (2013.01)

(58) Field of Classification Search
CPC ...... G06Q 10/107; G06Q 10/10; G06Q 10/06; H04L 12/585; H04L 12/58; H04L 12/581; H04L 12/5855; H04L 51/08; G06F 17/30592; G06F 17/30595; G06F 17/30457
USPC .......................................... 707/600; 709/206
See application file for complete search history.

(56) References Cited

U.S. PATENT DOCUMENTS

| | | | |
|---|---|---|---|
| 6,745,197 B2 | 6/2004 | McDonald | |
| 8,185,591 B1 | 5/2012 | Lewis | |
| 2006/0184632 A1 | 8/2006 | Marino et al. | |
| 2009/0157824 A1 | 6/2009 | Chu | |
| 2011/0047480 A1* | 2/2011 | Venkataraman | G06F 17/30867 715/748 |
| 2011/0208787 A1* | 8/2011 | Sidy | G06F 17/30867 707/809 |
| 2012/0008753 A1 | 1/2012 | Burnett et al. | |
| 2012/0197976 A1 | 8/2012 | Welingkar et al. | |
| 2012/0203733 A1* | 8/2012 | Zhang | G06Q 50/01 707/600 |
| 2014/0329497 A1 | 11/2014 | Sanzgiri et al. | |
| 2014/0379851 A1* | 12/2014 | LeCroy | H04L 67/02 709/217 |
| 2015/0365497 A1 | 12/2015 | Zhao et al. | |

* cited by examiner

*Primary Examiner* — Robert B Harrell
(74) *Attorney, Agent, or Firm* — Ropes & Gray LLP

(57) ABSTRACT

A cloud storage system receives information associating a user's cloud storage account with a network service account associated with a service provider. The cloud storage system identifies files associated with the network service account, retrieves metadata associated with the files, and provides a list of the files and their associated metadata to the user. The metadata stored by the cloud storage system may indicate the context of the identified files within the network service account. In response to a user command, the cloud storage system may store one of the identified files in the cloud storage account, and may continue to provide the content of the stored file within the network service account even if the stored file is deleted from the network service account.

25 Claims, 5 Drawing Sheets

SYSTEMS AND METHODS FOR INTEGRATING CLOUD STORAGE AND NETWORK SERVICE

BACKGROUND

Personal computers traditionally store files locally, on a medium directly accessed by the computer generating or editing the files. As network access has become more widespread, it has become feasible to store files on a remote network. Storing files on a remote network, also referred to as cloud storage, allows a user to access the files using any device that can access the network. Such cloud storage systems reduce the user's need for local storage capacity and assure the user that, regardless of which device is accessing a file, an up-to-date copy of the file is being accessed.

Existing cloud storage systems are minimally integrated with other network services handling computer files. If, for example, a user wishes to access files that she has received as email attachments in her cloud storage account, she must copy the file to her cloud storage account, often by accessing her email account through an email reader, copying the file to a local device, and subsequently uploading it to her cloud storage account.

SUMMARY

Thus there exists a need in the art to integrate cloud storage systems with other network services. The systems and methods described herein allow a cloud storage system to identify files associated with a user on another network service, provide the metadata associated with the identified files to the user, and, in response to a user command, store an identified file and its associated metadata in the user's cloud storage account.

In certain aspects, the systems and methods described herein relate to providing information regarding files associated with a network service account through a cloud storage account. In some implementations, the network service may be unrelated to cloud storage. A cloud storage server receives information for accessing a network service account associated with a network service from a user. The cloud storage server uses the access information to identify one or more files associated with the network service account and metadata associated with the one or more files. In some implementations, the cloud storage server may store metadata associated with the one or more identified files. The cloud storage server may compare each identified file to the other identified files to identify duplicate files, and may present the user with a list of the identified files and their associated metadata, which may exclude the duplicate files.

In certain aspects, the systems and methods described herein relate to storing files associated with a network service account in a cloud storage account. A cloud storage server receives information for accessing a network service account associated with a network service from a user. The cloud storage server uses the access information to identify one or more files associated with the network service account. In response to a command by the user, the cloud storage server stores a first file of the one or more files in the cloud storage account, which, in some implementations, comprises generating a pointer to the first file and storing the pointer in the cloud storage account.

BRIEF DESCRIPTION OF THE DRAWINGS

The systems and methods described herein are set forth in the appended claims. However, for the purpose of explanation, several embodiments are set forth in the following drawings.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the systems and methods described herein.

The systems and methods described herein relate to providing a "garden view" of files for a user's network service account through a cloud storage system, and copying such files to the user's cloud storage account in response to a user request. A user may authorize a cloud storage system to access one or more of the user's network service accounts. The cloud storage system may use that authorization to identify files associated with the user's respective network service accounts as well as information regarding those files. The cloud storage system may provide the user with a "garden view" of the files of the network service account, for example, as a list presenting information regarding files associated with the network service account. If the cloud storage system identifies that two or more files are duplicates of each other, the cloud storage system may provide information regarding only one of the duplicate files. Using the "garden view," list, or other interface, the user may choose to import files from the network service account into the user's cloud storage account. For example, a user may authorize a cloud storage server to access the user's email account. The cloud storage server may then offer the user a listing of the user's email attachments, which may provide information regarding each attachment file (which may include a filename, a filetype, a thumbnail depicting the file, a preview of the contents of the file, or other suitable information) and their context within the user's email account (such as the email thread in which each file appears).

Figure 1:
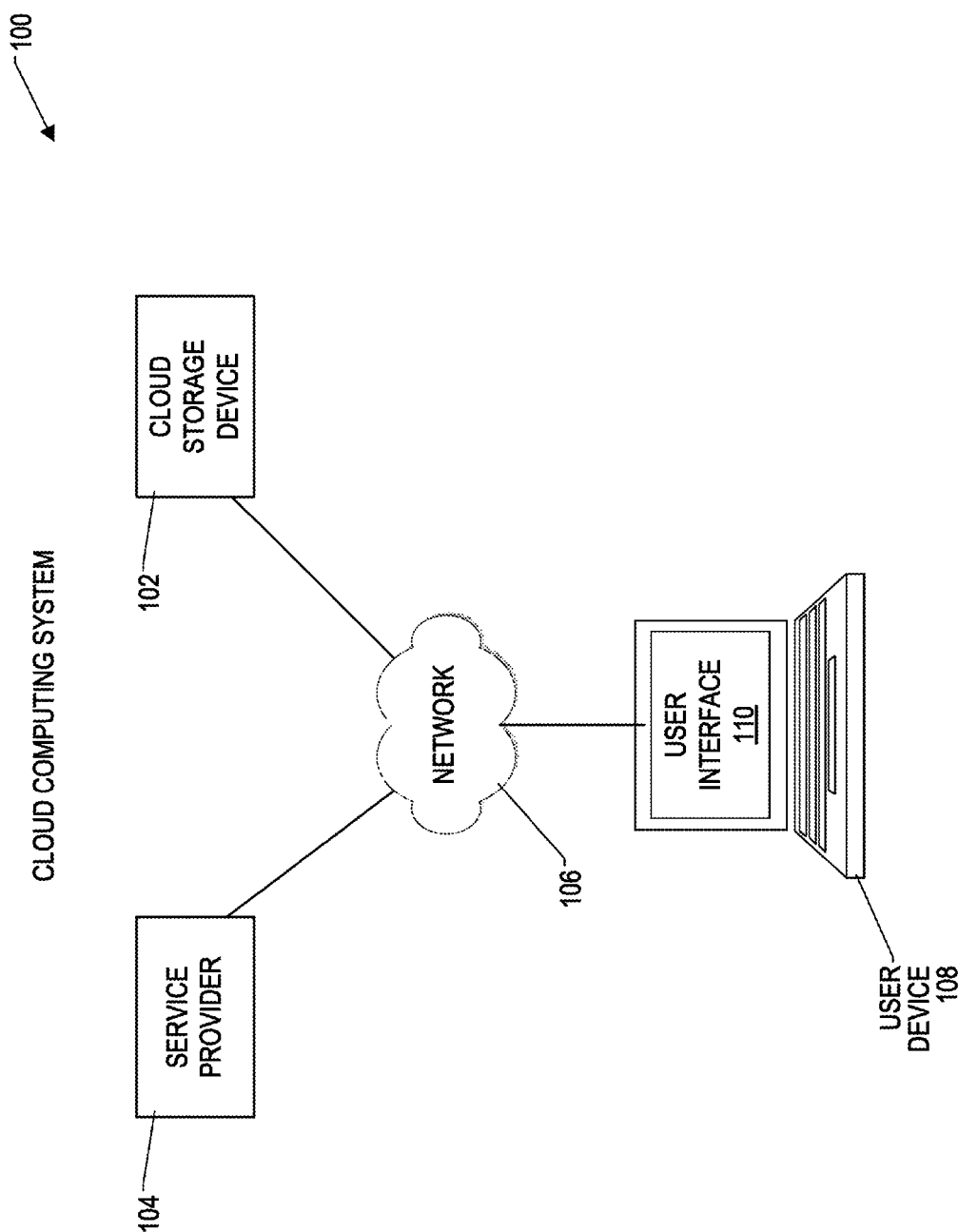
FIG. 1 is a block diagram of a cloud computing system, according to an illustrative implementation.

FIG. 1 is an illustrative block diagram of a cloud computing system 100, which provides remote storage of and access to computer files. Computer files may include text, pictures, audio files, video files, presentation files, spreadsheets, binary data files, computer instructions, HyperText Markup Language (HTML) files, or other suitable files. Files may be associated with a cloud storage device 102, which may be a server, a personal computer, a mainframe, a cluster of computing devices, or some other suitable computing device, and is described in more detail in relation to FIG. 2. As depicted, cloud computing system 100 may also access files associated with a service provider 104, which may run independently of cloud storage device 102. Both cloud storage device 102 and service provider 104 may be connected to network 106, through which files and other information may be transmitted. Network 106 is a computer network, and in certain implementations may be the Internet. A user accesses cloud storage device 102 and service provider 104 through user device 108. The user may interact with cloud storage device 102 and service provider 104 through user interface (UI) 110, which may be generated by user device 108 based on instructions sent by cloud storage device 102. The user may access information regarding the user's files associated with service provider 104 through cloud storage device 102, and may provide commands to cloud storage device 102 to store files from service provider 104 in the user's cloud storage account.

Service provider 104 is a computing device used to provide network services, and may be a server, a personal computer, a mainframe, a cluster of computing devices, or some other suitable computing device. Service provider 104 may provide email service, a social networking service, a content sharing service, or some other suitable service. In response to an authorized query from cloud storage device 102, service provider 104 may transmit metadata regarding one or more files associated with a user's network service account to cloud storage device 102, or may transmit the contents of or metadata regarding a file designated in the query to cloud storage device 102. In some implementations, service provider 104 may be administered by a different party than that administering cloud storage device 102, in which case the network service it provides may be referred to as a third-party network service. In some implementations, there may be a different number of service providers 104 than is here depicted. In such implementations, cloud storage device 102 may provide the user with information regarding files stored on any service provider 104 with which the user has an account, but may present information regarding files on distinct service providers 104 in different lists. In such implementations, cloud storage device 102 may also save files from any service provider 104 with which the user has an account to the user's cloud storage account.

User device 108 is a computing device used to access cloud storage device 102, and may be a personal laptop computer, a personal desktop computer, a tablet computer, a smartphone, or some other suitable computing device. In certain implementations, user device 108 may store information regarding one or more users, a list of network service accounts associated with one or more users, a list of cloud storage accounts associated with one or more users, network service account information associated with a user, or other suitable information regarding the capability of user device 108 to access files stored on cloud storage device 102 or service provider 104. In such implementations, user device 108 may be configured to transmit a portion or the whole of such information upon first connecting to cloud storage device 102 or service provider 104, in response to a query by cloud storage device 102 or service provider 104, or under other suitable circumstances. Although one user device 108 is depicted for simplicity, multiple users may access cloud storage device 102 with multiple user devices 108.

UI 110 is an interface through which a user may access files and applications associated with cloud storage device 102 and one or more service providers 104. UI 110 may be an application, such as a web browser or other suitable application, which is run by user device 108 and which displays information received from cloud storage device 102 or a service provider 104. UI 110 may interpret predetermined actions by a user (such as selecting an icon with a cursor or on a touchscreen, selecting a menu option with a cursor or on a touchscreen, writing a text command, or other suitable actions) and transmit user commands to cloud storage device 102 and service provider 104 accordingly. Commands may include requests to display a list of files associated with a network service account, store a file associated with a network service account in a cloud storage account, and other suitable commands.

Cloud computing system 100 allows users to access file information associated with a network service account through cloud storage device 102. User device 108 connects to cloud storage device 102 through network 106. UI 110 displays information provided by cloud storage device 102 to user device 108, which may include a list of information regarding files stored on service provider 104 and associated with the user. A user may interact with UI 110 to store a file associated with the user's network service account in the user's cloud storage account, such as by selecting an icon with a cursor.

Figure 2:
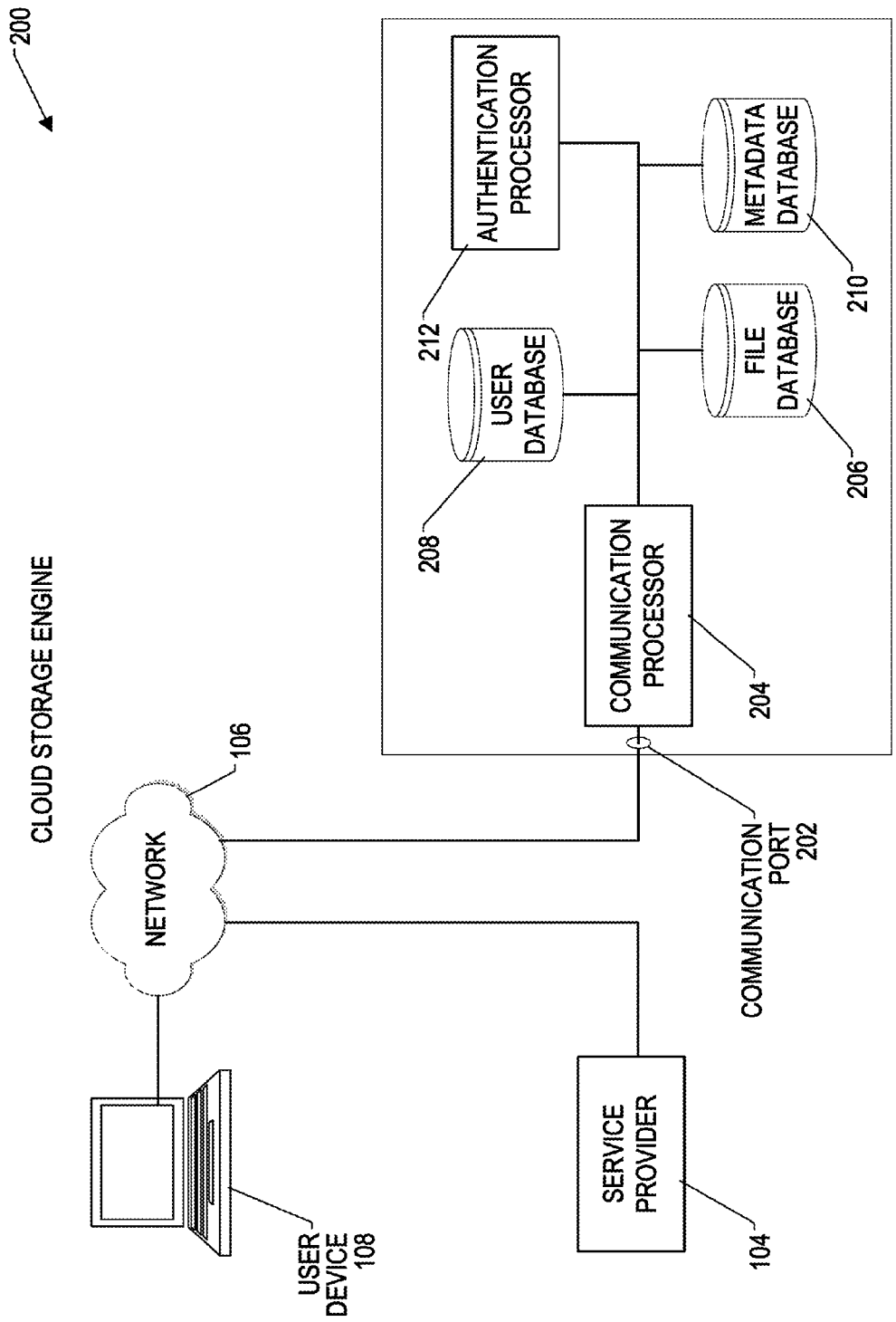
FIG. 2 is a block diagram of a cloud storage engine, according to an illustrative implementation.

FIG. 2 is an illustrative block diagram of a cloud storage engine 200, which may act as the cloud storage device 102 of FIG. 1. Cloud storage engine 200 may request file information from service provider 104 and transmit such information to an associated user device 108 over network 106. Cloud storage engine 200 transmits and receives data through communication port 202. Communication processor 204 acts on incoming data received through communication port 202 and transmits information to a service provider 104 or a user device 108 in accord with user commands. Files are stored in file database 206, user information is stored in user database 208, and file metadata may be stored in metadata database 210. Authentication processor 212 may verify the authorization of a request to access information associated with a file.

The depicted communication port 202 is a network port which sends and receives data via network 106, which may include user commands, information regarding files stored on service provider 104, information regarding files stored on cloud storage engine 200, or other suitable data. Communication port 202 may include a 100BASE-TX port, a 1000BASE-T port, a 10GBASE-T port, a Wi-Fi antenna, a cellular antenna, or other suitable network ports. In certain implementations, there may be a different number of ports than are depicted. In certain implementations, communication port 202 may provide secure communications, such as by using the Secure Sockets Layer (SSL) protocol, the Transport Layer Security (TLS) protocol, or other suitable protocol.

Communication processor 204 may be a computer processor that routes or acts upon data received through communication port 202. Upon a user device 108 connecting to cloud storage engine 200, communication processor 204 may identify a user associated with the connection, in certain implementations by comparing information provided in the connection request to information stored in user database 208. Communication processor receives user-provided information regarding a user's network service account, which may include an address of the service provider 104 associated with the network service account, information identifying the account, security information for accessing the account, or other suitable information. Communication processor 204 may use the provided information to request information regarding files associated with the network service account from service provider 104. The information request may be directed toward all files associated with the network service account, a specific file associated with the network service account, or files that are associated with the network service account and meet some other requested criteria. In the latter case, the requested criteria may include one or more of a filename, a filetype, association with one or more other users, a creation date, or other suitable attributes. The requested information may include metadata regarding the files, links to access the files, content of the files, or other suitable information. To present the user with a list of files associated with the network service account, communication processor 204 transmits metadata received in response to the information request to user device 108. In some implementations, communication processor 204 may filter the list of files presented to the user based on predetermined criteria, user-provided criteria, or some combination thereof. Predetermined criteria may include whether a file is a duplicate of another file or other suitable criteria. User-provided criteria may include whether a file has been edited within a user-designated date range or other suitable criteria. In some implementations, communication processor 204 may store metadata associated with the identified files in metadata database 210. In response to a command by the user, communication processor 204 may request file data from a service provider 104 and store the file data in file database 206.

File database 206 may be a computer-readable and -writable medium storing at least one file associated with a cloud computing system 100, which may include text, images, audio files, video files, spreadsheets, presentation files, HTML files, or other suitable computer files. In some implementations, file database 206 may also store files associated with one or more service providers 104. In such implementations, a file in file database 206 may be associated with a user account associated with cloud storage engine 200, with a network service account associated with the one or more service providers 104, or with both. In such implementations, file database 206 may be accessed through network 106, and files may be associated with a cloud storage account or a network service account by metadata associated with the file, by pointers associated with an account, or by some other suitable means. In some implementations, a portion of file database 206 may be accessed through a remote network, and may be a third-party database.

User database 208 may be a computer-readable and -writable medium storing information associated with at least one user of cloud storage engine 200. The information may include one or more of a username and password associated with a user, pointers to the files associated with each user, links to files associated with the user and stored on a service provider 104, network service account information associated with the user, a list of at least one user device 108 associated with the user, user-specified preferences, or other suitable user information. In some implementations, user database 208 may be integrated with file database 206: a user's files and links to files may be stored with other user information.

Metadata database 210 may be a computer-readable and -writable medium storing metadata regarding files stored in file database 206. Metadata is information related to a file, and may include the name of the file, a type of the file, a creation date of the file, a most recent edit date of the file, which user account or accounts a file is associated with, which users are permitted to access or edit the file, whether a file was uploaded from a user device 108 or from a service provider 104, or other suitable information. In some implementations, metadata database 210 may store metadata regarding files that are associated with a network service account but not with a cloud storage account. In such implementations, metadata stored in metadata database 210 may indicate whether a file has been stored in a cloud storage account and whether the network service account still stores the file. In some implementations, metadata database 210 may store metadata specific to the service provider 104 in which it was stored. As an illustrative example, if service provider 104 is an email server, metadata database 210 may store information identifying an email thread associated with an email attachment. In some implementations, metadata database 210 may be integrated with file database 206: files and links to files may be stored with their associated metadata.

Authentication processor 212 may be a computer processor which blocks unauthorized access of information associated with cloud storage engine 200. Unauthorized access may be detected by comparing one or more of a username and password combination, information identifying a user device 108, geographic information associated with the user device 108, or other suitable information with information stored in user database 208. If an attempt to access information associated with a cloud storage account fails verification, or if an attempt to access a network service account fails, authentication processor 212 may transmit a message to the user or a system administrator, block user device 108, temporarily lock the user account, or take some other predetermined action. In certain implementations, if a user device 108 has not previously been connected to cloud storage engine 200, authentication processor 212 may require the user to provide identification information, which may include a username and password combination, an identification number provided to the user by a voice or text message sent to a telephone number previously provided by the user, or other predetermined identification information. In certain implementations, authentication processor 212 may verify that a user device 108 may be allowed to access account information by searching file database 206, user database 208, and metadata database 210 to determine whether the user device 108 is associated with the user, whether the user device 108 is associated with the cloud storage account or network service account associated with the information, or other suitable verification information. In some such implementations, authentication processor 212 may verify a security token provided by the user device 108 against information stored in one or more of file database 206, user database 208, or metadata database 210. In certain implementations, authentication processor 212 may establish a secure connection with service provider 104 or user device 108 using a protocol such as the SSL or TLS protocols.

Cloud storage engine 200 sends data to and receives data from service provider 104 and user device 108 at communication port 202 via network 106. Communication processor 204 may identify a cloud storage account associated with a user upon the establishment of a connection with a user device 108, and authentication processor 212 may compare information provided by user device 108 with information stored in user database 208 to verify that the user has access to the cloud storage account. Using network service account access information provided by the user and stored in user database 208, communication processor 204 may retrieve information regarding files stored on a service provider 104 and store such information in user database 208 or metadata database 210. Communication processor 204 may provide a list of a user's files associated with a service provider 104 to the user via user device 108, and may receive a user command to store a file associated with a service provider 104. Communication processor 204 may respond to a file storage command by requesting and receiving a copy of the file from the service provider 104 and storing the copy in file database 206. In some implementations in which file database 206 is shared with a service provider 104, communication processor 204 may instead generate and store a link to the file in user database 208. In some such implementations, communication processor 204 may transmit metadata such as identification of the user's cloud storage account to the service provider 104 upon storing the link.

Figure 3:
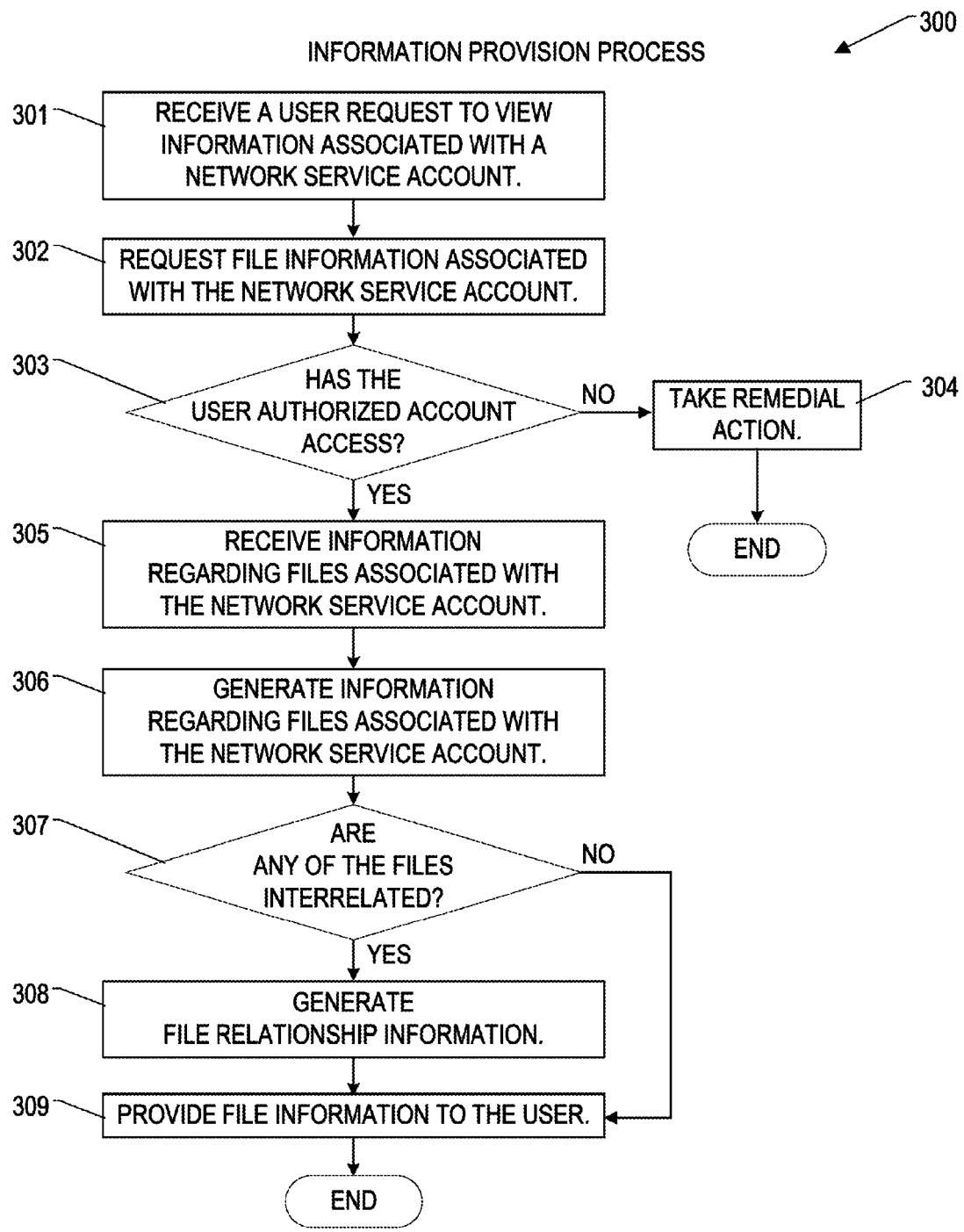
FIG. 3 is a flow chart of a process for providing information regarding files associated with a network service account to a user associated with a cloud storage account, according to an illustrative implementation.

FIG. 3 is an illustrative flow chart of an information provision process 300. Information provision process 300 provides information regarding files associated with a network service account to a user of a cloud storage account. Referring to FIG. 2, information provision process 300 begins with step 301, in which a communication processor 204 receives a user request to view information regarding files in a network service account associated with the user. In some implementations, authentication processor 212 may verify the identity of the user making the request, as described in relation to FIG. 2. Referring to FIG. 1, the user request may include verification information required by service provider 104 to access account information or other suitable network service account information. In some implementations, such network service account verification information may be stored in user database 208, and the user request may not always include such information. In some such implementations, the user request may include network service account verification information when the user first requests information regarding the network service account. In other such implementations, communication processor 204 may generate a request to user device 108 for network service account verification information in response to a user request to view information regarding the files of a network service account that the user is not yet associated with in user database 208.

In step 302, communication processor 204 uses the network service account information provided in step 301 to request information regarding files corresponding to the network service account from service provider 104. In some implementations, communication processor 204 may transmit information identifying itself as a cloud storage engine 200 accessing information on behalf of a user rather than simply providing the user's account access information, enabling service provider 104 to reject the request for information unless the user has separately authorized service provider 104 to provide file information to cloud storage engine 200. In some implementations, the request generated in step 302 asks for information regarding only changes to files associated with the network service account since the last time communication processor 204 transmitted such a request.

In step 303, communication processor 204 determines if the user has properly provided account access information in step 301 by identifying the nature of the response to the request of step 302. If the request is rejected or does not prompt a response within a predetermined amount of time, remedial action may be taken in step 304. The remedial action may be related to whether a response was received from service provider 104, and, if so, what the response was. The remedial action may include transmission of a message to the user or a system administrator, blocking the user device 108 from which account information was received, temporarily locking the user's cloud storage account, or some other predetermined action. If the request is accepted, communication processor 204 may receive information regarding one or more files associated with the network service account in step 305, which may include links or pointers to the files, metadata of the type stored in metadata database 210, or other suitable information. In some implementations, communication processor 204 may record the received information in file database 206, user database 208, or metadata database 210 as appropriate. In step 306, communication processor 204 may generate information regarding a file. As an illustrative example, communication processor 204 may generate a URL that, when accessed, generates a thumbnail image representing an associated image file, or a URL that, when accessed, generates a thumbnail animation representing an associated video file.

In step 307, communication processor 204 may determine whether files associated with the network service account are related to each other, such as by being duplicates of each other, multiple versions of each other, or being in some other way interrelated. Relationships between files may be identified based on the files' content or metadata. As an illustrative example of identifying an interrelationship based on content, communication processor 204 may identify whether one file is identical to another by determining whether each file's content generates the same output when provided to a predetermined hash function. As an illustrative example of detecting an interrelationship based on metadata, if three files associated with an email account are associated with the same email thread (such as by being associated with emails having a header identifying an earlier email in the same thread, related subject lines, related senders and recipients, or other suitable characteristics), share the same name and filetype, the three files may be identified as different versions of each other.

If communication processor 204 identifies interrelated files in step 307, it may generate file relationship information in step 308, and, in some implementations, store such information in metadata database 210. File relationship information may identify a version number of each related file, which may be based on when each related file was generated, when each related file was last edited, or other suitable metadata. In some implementations, a user may command communication processor 204 to combine different versions of a file in the user's network service account into a single file in file database 206. Such a combined file may include the content of the most recent identified version of the file and annotations indicating how the included content differs from the earliest identified version. In some such implementations, annotations may further indicate intermediate changes between the earliest and the final versions of the file. Step 308 is followed by step 309, as is step 307 if no interrelationships are found. In some implementations, information provision process 300 may not include steps 307 or 308, in which case step 309 directly follows step 306.

Information provision process 300 ends with step 309, in which communication processor 204 provides network service account file information to the user via user device 108. The information provided may include each file's filename, filetype, date of uploading to the network service account, context within the network service account, version as identified by communication processor 204, information generated in step 306, information generated in step 308, or other suitable information. Some information may not be transmitted in step 309, which may include information regarding files smaller than a predetermined or user-selected threshold, information regarding all but one of a set of duplicate files, or other suitable information. In some implementations, step 309 may provide information for a subset of the files associated with the network service account, and may provide information regarding other subsets in response to a user request. As an illustrative example of such implementations, if a large number of files are associated with the network service, step 309 may transmit information regarding only a first portion of the files. In such an example, step 309 may be repeated to transmit information regarding a second portion of the files in response to a user action, which may include scrolling to the bottom of a list of the first portion of the files, clicking a link to another page of a list of files, or some other suitable action.

In some implementations, authentication processor 212 may verify the identity of a user before step 309 may be completed. In some implementations, steps 302 through 309 of identification provision process 300 may be repeated to maintain the accuracy of the list provided to the user. In such implementations, the steps may be repeated at predetermined intervals, in response to a user request to access information regarding files associated with the network service account, in response to receiving a notification from service provider 104 of a change to files or metadata associated with the service account, or on some other suitable basis.

Figure 4:
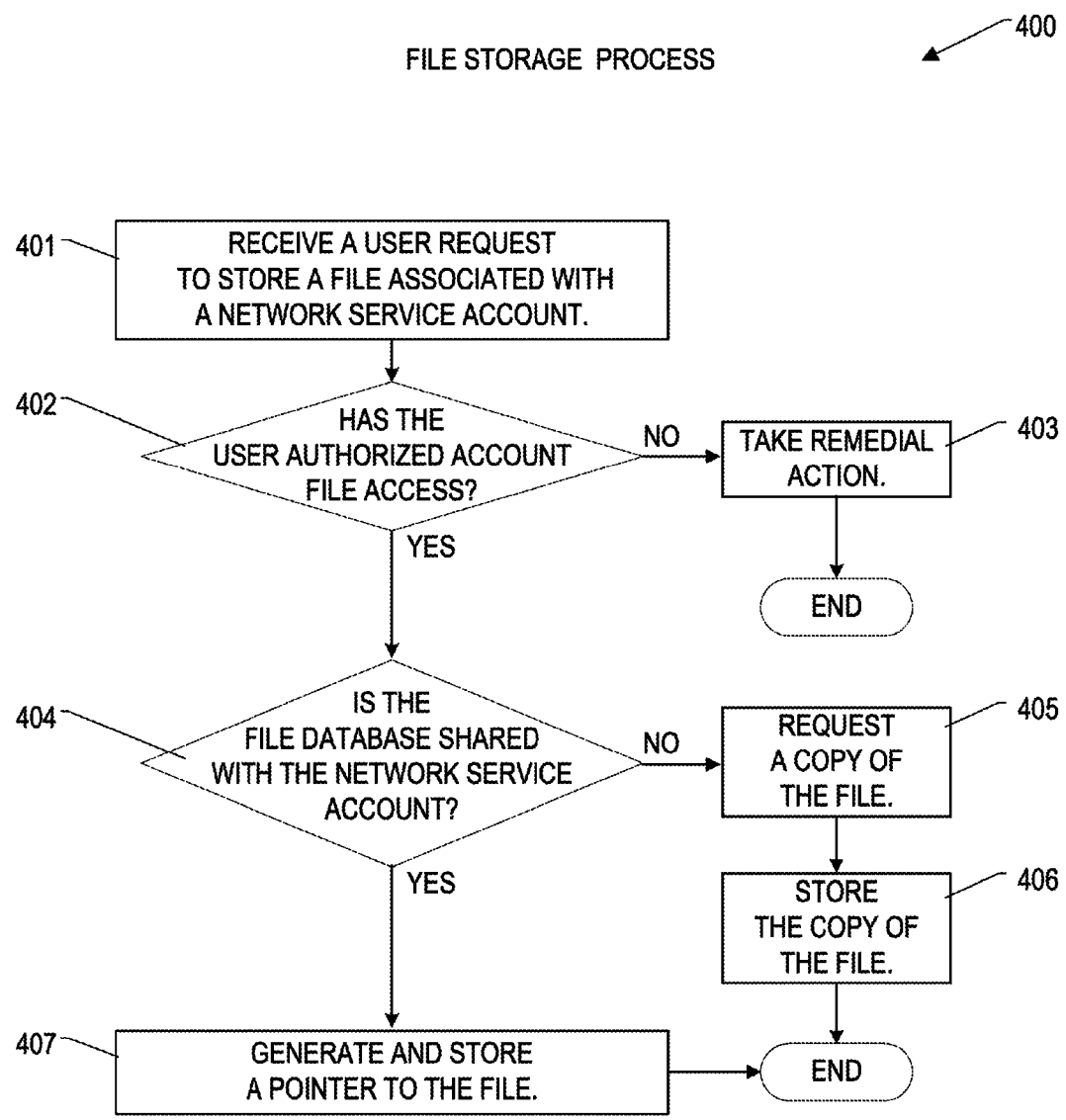
FIG. 4 is a flow chart of a process for storing a file associated with a network service account on a cloud storage account, according to an illustrative implementation.

FIG. 4 is an illustrative flow chart of a file storage process 400. File storage process 400 stores a file associated with a network service account on a cloud storage account. Referring to FIG. 2, file storage process 400 begins with step 401, in which communication processor 204 receives a user request to store a file associated with a network service account in the user's cloud storage account. A user may generate the request using the information provided by information provision process 300, which may include accessing a link, selecting a button, or some other suitable action. In some implementations, the user request may be automatically generated according to user-provided preferences, which may include storing all files meeting user-provided criteria. In some implementations, authentication processor 212 may verify the identity of the user making the request, as described in relation to FIG. 2. Referring to FIG. 1, the user request may include verification information required by service provider 104 to retrieve file information or other suitable network service account information. In some implementations, such network service account verification information may be stored in user database 208, and the user request may not always include such information. In some such implementations, the user request may include network service account verification information when the user first requests information regarding the network service account. In other such implementations, communication processor 204 may generate a request to user device 108 for network service account verification information in response to a user request to store a file associated with a network service account that the user is not yet associated with in user database 208.

In step 402, communication processor 204 determines whether the user properly provided network service account access information in step 401 by requesting access to the file indicated in step 401. In some implementations, communication processor 204 may transmit information identifying itself as a cloud storage engine 200 accessing information on behalf of a user rather than simply providing the user's account access information, enabling service provider 104 to reject the request for information unless the user has separately authorized service provider 104 to provide file information to cloud storage engine 200. If the request is rejected or does not prompt a response within a predetermined amount of time, remedial action may be taken in step 403. The remedial action may be related to whether a response was received from service provider 104, and, if so, what the response was. The remedial action may include transmission of a message to the user or a system administrator, blocking the user device 108 from which account information was received, temporarily locking the user's cloud storage account, or some other predetermined action. If the request is accepted, file storage process 400 proceeds to step 404.

In step 404, communication processor 204 determines whether file database 206 is shared between cloud storage engine 200 and service provider 104. If not, communication processor 204 requests a copy of the file and metadata associated with the file from service provider 104 in step 405. The associated metadata may include general file information, such as the filename, the filetype, or other suitable information. In some implementations, the associated metadata may be specific to the service provider 104. As an illustrative example of such implementations, if service provider 104 is an email server, the associated metadata may indicate an email thread with which the file is associated. File storage process 400 then ends with step 406, in which communication processor 204 stores the copy in file database 206, associated metadata in metadata database 210, and information linking the user to the copy in user database 208.

If file database 206 is instead shared between cloud storage engine 200 and service provider 104, file storage process 400 instead ends with step 407. In step 407, communication processor 204 generates a pointer to the file's location in file database 206, and stores the pointer in user database 208. In some implementations, communication processor 204 may also modify metadata associated with the file in response to step 407. As an illustrative example of such an implementation, communication processor 204 may generate metadata indicating that the file is stored in a cloud storage account, thereby indicating that the file should not be deleted from file database 206 even if the user subsequently deletes the file from the user's network service account. In some such implementations, communication processor 204 may transmit metadata to the network service account, which may allow the network service account to provide a user with an indicator that the file has been saved to a cloud storage account or provide other information.

In some implementations, authentication processor 212 may verify the identity of a user before step 404 may be completed. In some implementations, file storage process 400 may be repeated for a user-designated file in response to communication processor 204 receiving a notification from service provider 104 of a change to the user-designated file, of a change to metadata associated with the user-designated file, or based on some other suitable criteria.

In some implementations, communication processor 204 may not save a file if the file or a duplicate of the file has already been saved to the cloud storage account. In such implementations, metadata database 210 may indicate whether a file associated with a network service account has been saved to a cloud storage account, while communication processor 204 may identify duplicate files by comparing the output of a predetermined hash function of the file data for each file, the names of each file, the types of each file, service-specific metadata of each file, or other suitable information.

Figure 5:
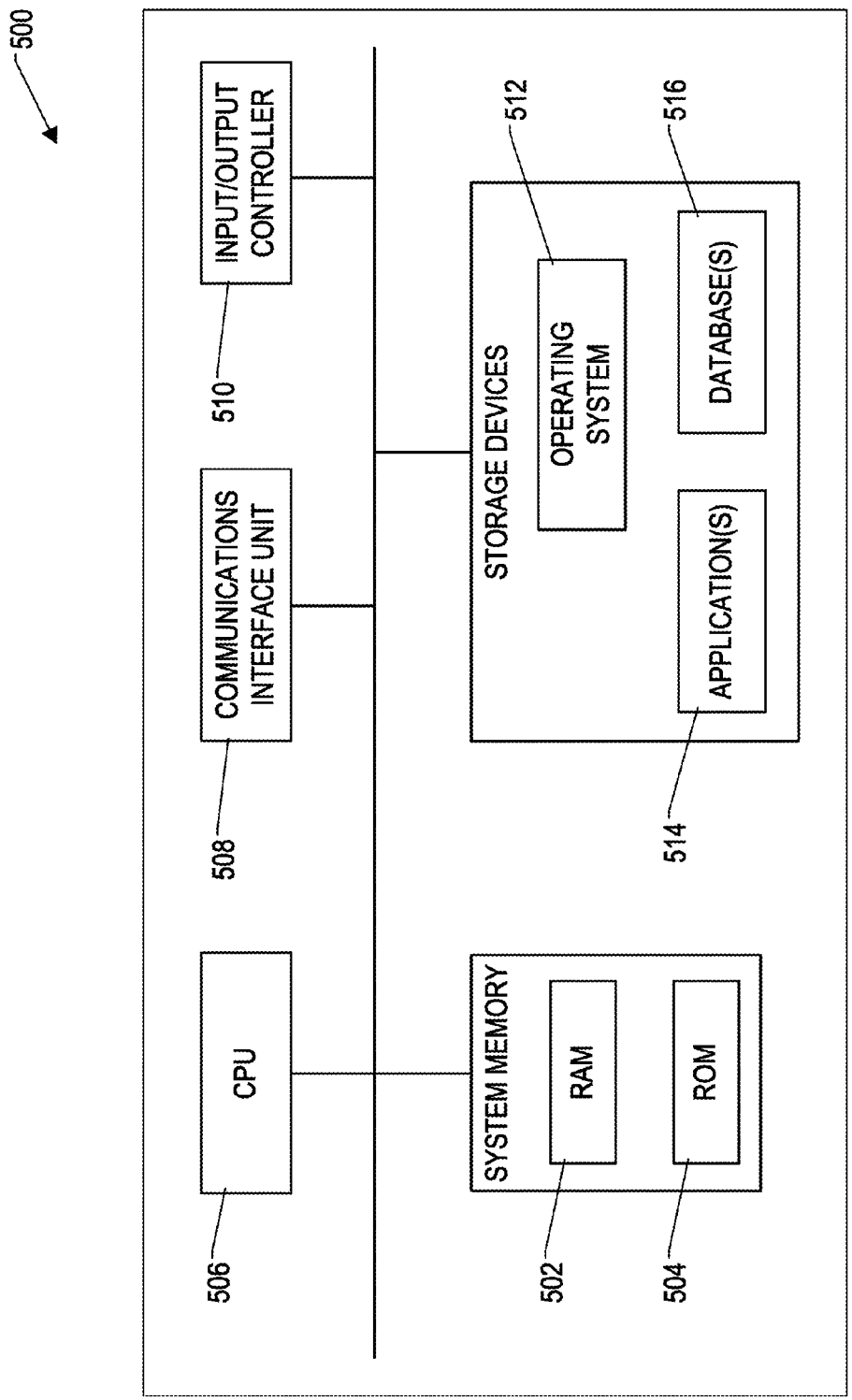
FIG. 5 is a block diagram of a computing device for performing any of the processes described herein, according to an illustrative implementation.

FIG. 5 is a block diagram of a computing device that can be used to implement or support any of the components of the system of FIG. 1 or 2, and for performing any of the processes described herein. Cloud storage engine 200 may be implemented on one or more computing devices 500 having suitable circuitry, and user device 108 may communicate with cloud storage device 102 through one or more computing devices 500 having suitable circuitry. In certain aspects, a plurality of the components of cloud computing system 100 may be included within one computing device 500. In certain implementations, a component and a storage device may be implemented across several computing devices 500.

The computing device 500 comprises at least one communications interface unit 508, an input/output controller 510, system memory, and one or more data storage devices. This can support a network connection such as a connection to network 106 in FIG. 1. The system memory includes at least one random access memory (RAM 502) and at least one read-only memory (ROM 504). RAM 502 can support the file database 206 of FIG. 2, for example. All of these elements are in communication with a central processing unit (CPU 506) to facilitate the operation of the computing device 500. The computing device 500 may be configured in many different ways. For example, the computing device 500 may be a conventional standalone computer or alternatively, the functions of computing device 500 may be distributed across multiple computer systems and architectures. In FIG. 5, the computing device 500 may be linked, via network or local network, to other servers or systems.

The computing device 500 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 508 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers, or client terminals.

The CPU 506 is also in communication with the data storage device. The data storage device may comprise an appropriate combination of magnetic, optical, or semiconductor memory, and may include, for example, RAM 502, ROM 504, flash drive, an optical disc such as a compact disc, or a hard disk or drive. The CPU 506 and the data storage device each may be, for example, located entirely within a single computer or other computing device; or connected to each other by a communication medium, such as a USB port, serial port cable, a coaxial cable, an Ethernet cable, a telephone line, a radio frequency transceiver, or other similar wireless or wired medium or combination of the foregoing. For example, the CPU 506 may be connected to the data storage device via the communications interface unit 508. The CPU 506 may be configured to perform one or more particular processing functions.

The data storage device may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store information that may be utilized to store information required by the program. The depicted database 516 can be any suitable database system, and can be a local or distributed database system.

The operating system 512 and applications 514 may be stored, for example, in a compressed, an uncompiled and an encrypted format, and may include computer program code. The instructions of the program may be read into a main memory of the processor from a computer-readable medium other than the data storage device, such as from the ROM 504 or from the RAM 502, or from a computer data signal embodied in a carrier wave, such as that found within the well-known Web pages transferred among devices connected to the Internet. While execution of sequences of instructions in the program causes the CPU 506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to a cloud storage system as described herein. The program also may include program elements such as an operating system 512, a database management system, and "device drivers" that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic, or optical signals, which are exemplary forms of wireless communications or data streams that carry various types of information.

Some implementations of the above described may be implemented by the preparation of application-specific integrated circuits or by interconnecting an appropriate network of conventional component circuits, as will be apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. For example, cloud storage engine 200 may transmit files to or between service providers 104, or may store files that are transmitted to cloud storage engine 200 from a service provider 104 in a cloud storage account if accompanied by proof that the file was transmitted in response to a command by the cloud storage account's user. It should be understood that various alternatives to the embodiments of the disclosure described herein may be employed in practicing the disclosure. Elements of an implementation of the systems and methods described herein may be independently implemented or combined with other implementations. It is intended that the following claims define the scope of the disclosure and that methods and structures within the scope of these claims and their equivalents be covered thereby.

We claim:

1. A computer-implemented method for storing a file with a network service account in a cloud storage account, comprising:
   receiving, via a hardware processor at a cloud storage server and from a user, information for accessing a network service account with a network service and the user;
   accessing, via the hardware processor at the cloud storage server, the network service account;
   identifying, via the hardware processor at the cloud storage server, one or more files with the network service account;
   providing, via a user interface, a list of the one or more files to the user;
   in response to a command to select a file from the list by the user, storing, via the hardware processor at a file database at the cloud storage server, the file of the one or more files in a cloud storage account with the user and metadata describing the file and file relationship information between the file and other files from the one or more files when the file database is not shared with the network service account; and
   generating and storing, at the file data base at the cloud storage server, a pointer to the file associated with the network service account when the file database is shared with the network service account.

2. The method of claim 1, wherein the network service account is an email account.

3. The method of claim 2, wherein each of the one or more files is an email attachment.

4. The method of claim 2, wherein the metadata includes information identifying an email thread.

5. The method of claim 1, further comprising determining that the file is a version of a second file of the one or more files.

6. The method of claim 5, further comprising generating an annotated file indicating at least one difference between the file and the second file files.

7. The method of claim 1, wherein the network service is a third-party network service.

8. The method of claim 1, wherein the network service account is a first network service account, and the network service is a first network service, the method further comprising:
   receiving, at the cloud storage server and from the user, information for accessing a second network service account with a second network service and the user;
   accessing, by the cloud storage server, one or more files with the second network service account;
   identifying, by the cloud storage server, a second file with the second network service account; and
   in response to a command by the user, storing, by the cloud storage server, the second file in the cloud storage account with the user and metadata describing the second file.

9. The method of claim 1, wherein the metadata includes metadata specific to the network service account.

10. The method of claim 1, wherein storing the file in the cloud storage account comprises generating a pointer to the file and storing the pointer in the cloud storage account.

11. The method of claim 1, further comprising determining that the file is identical to a second file of the one or more files.

12. The method of claim 1, further comprising generating the user command in response to determining that the file meets user-provided criteria.

13. The method of claim 1, wherein the file relationship information is identified when the one or more files share same contents, a same email thread, a same name, or a same file type.

14. A cloud storage system, comprising:
   a communication interface that receives, from a user, information for accessing a network service account;
   a hardware communication processor that identifies one or more files with the network service account and determines file relationship information among the one or more files, wherein a list of the one or more files is presented to a user via a user interface;
   a file database that stores a plurality of files, wherein the file database is configured to store a file of the one or more files in response to a command by the user to select the file from the list when the file database is not shared with the network service account, or generate and store a pointer to the file associated with the network service account when the file database is shared with the network service account; and
   a metadata database that stores metadata describing the plurality of files and file relationship information between the file and other files from the one or more files.

15. The system of claim 14, wherein the network service account is an email account.

16. The system of claim 15, wherein each of the one or more files is an email attachment.

17. The system of claim 15, wherein the metadata includes information identifying an email thread.

18. The system of claim 14, wherein the communication processor is further configured to determine that the file is a version of a second file of the one or more files.

19. The system of claim 18, wherein the communication processor is further configured to generate an annotated file indicating at least one difference between the file and the second file.

20. The system of claim 14, wherein the network service is a third-party network service.

21. The system of claim 14, wherein the network service account is a first network service account, and the network service is a first network service, and the communication processor is further configured to:

receive, from the user, information for accessing the second network service account, identify a second file with the second network service account, and in response to a command by the user, store the second file in the file database.

22. The system of claim 14, wherein the metadata includes metadata specific to the network service account.

23. The system of claim 14, wherein the communication processor is further configured to determine that the file is identical to a second file of the one or more files.

24. The system of claim 14, wherein the communication processor is further configured to generate the command in response to determining that the file meets user-provided criteria.

25. The system of claim 14, wherein the file relationship information is identified when the one or more files share same contents, a same email thread, a same name, or a same file type.

* * * * *